Patented June 21, 1927.

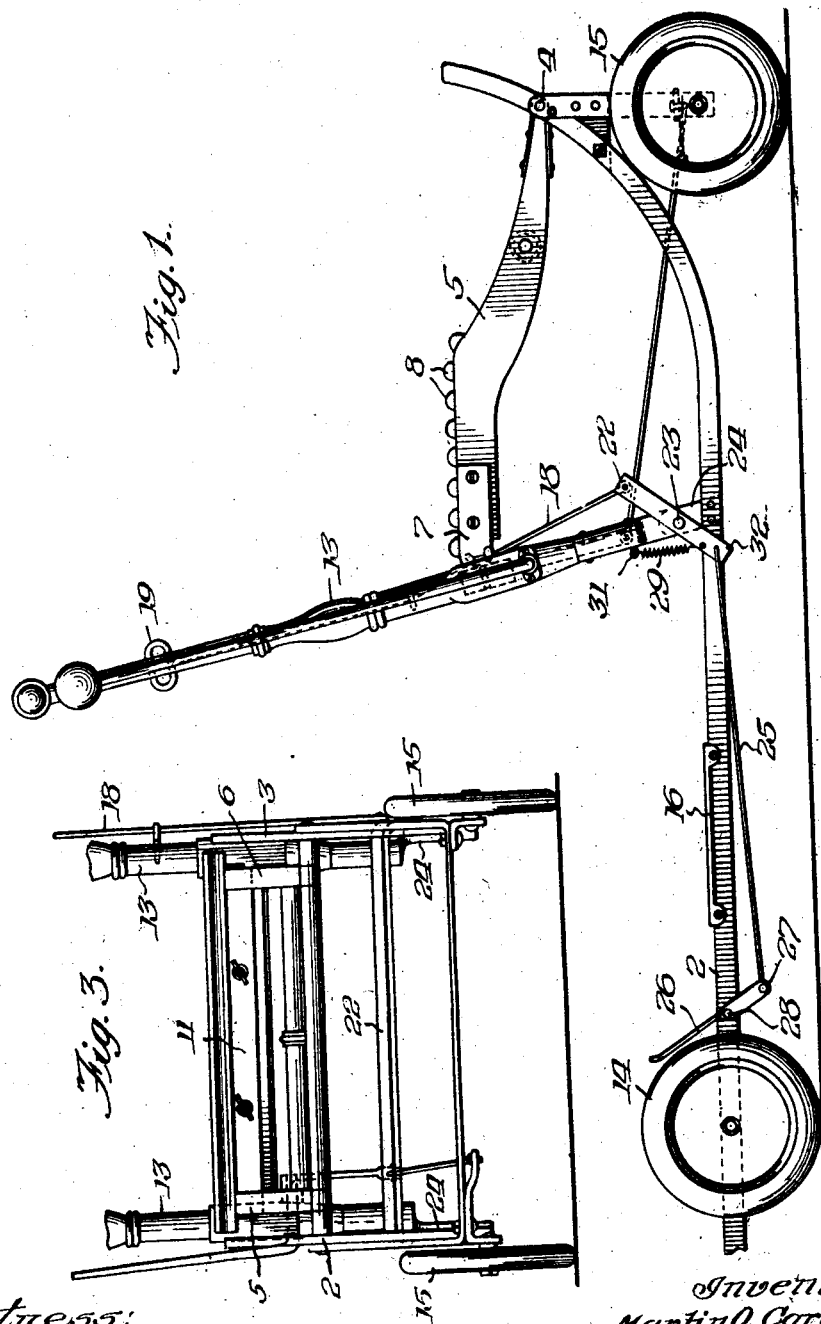

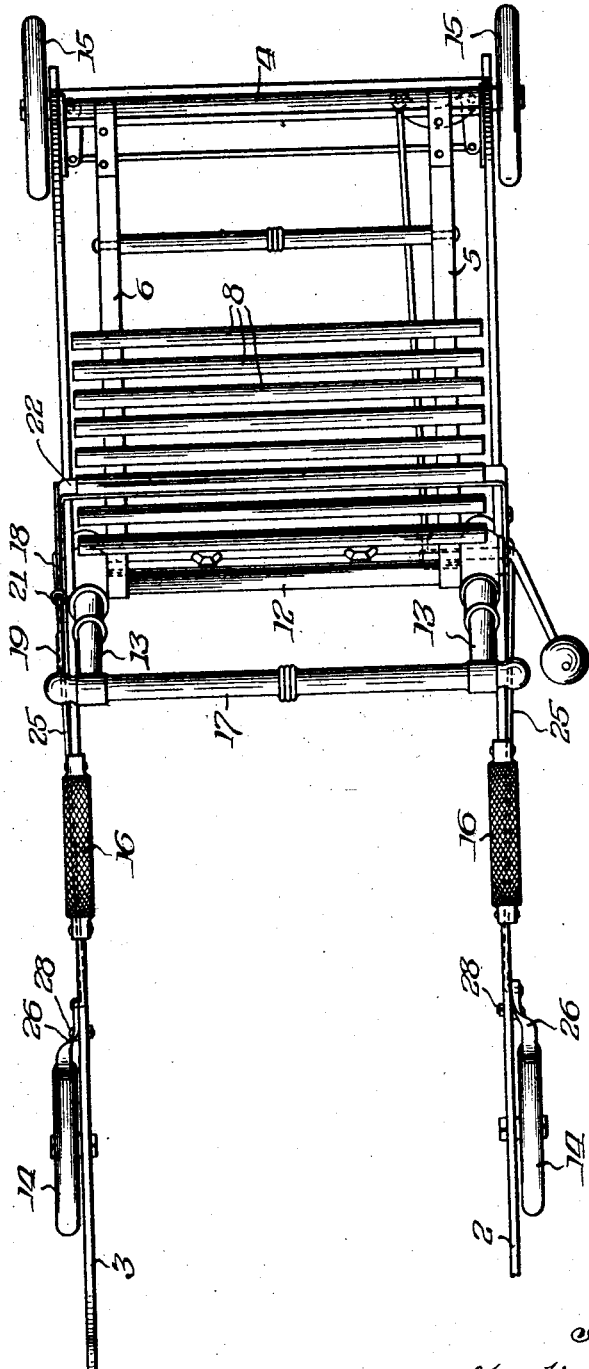

1,633,363

UNITED STATES PATENT OFFICE.

MARTIN O. CARLSON, OF CHICAGO, ILLINOIS.

PUSH-SLED BRAKE.

Original application filed December 10, 1924, Serial No. 754.931. Divided and this application filed November 20, 1926. Serial No. 149,562.

This invention pertains to sled construction and more particularly to a combination vehicle which may be used as a sled on the snow and ice in winter time and as a wheeled coaster or glider when the snow and ice are gone from the ground.

One of the primary objects of the invention is to provide a vehicle of the character specified which may be propelled by one foot of a rider standing upright on the sled on the other foot, and to provide a handle to which the rider may cling with his hands while propelling the vehicle.

Another primary object is to provide a vehicle of the character described having a combined brake mechanism adapted to brake upon the wheels or upon the ice or snow, dependent upon the use to which the vehicle is being put.

Other objects include the provision of a vehicle of the character described which will be strong and durable, economical to manufacture, one which will be light enough for use by young children, one which may be easily steered, readily propelled, quickly braked and susceptible of high speed.

Many other objects together with inherent advantages of my invention will or should become readily appreciated, as it is better understood, by reference to the following description and claims and from the drawings in which:

Fig. 1 is a side elevation of a vehicle constructed in accordance with one form of my invention, Fig. 2 is a top plan view thereof, and Fig. 3 is a front elevation with the upper structure broken away.

This application is a division of my copending application, Serial No. 754,931, filed December 10, 1924, and the vehicle illustrated herein comprises two longitudinally extending and substantially parallel runners 2 and 3 curved upwardly at their forward ends and connected by a transverse member 4 which serves to rigidly brace and space the runners apart. The rod 4 serves to pivotally mount the forward end of a seat frame, including the side members 5 and 6 which are connected together at their rear ends by a metal yoke 7 and across the tops of which slats 8 are nailed or screwed for the seat. The yoke 11 is suitably connected to a transverse bar 12 extending between portions of the upright handle bars 13. Further details of the general construction of the sled, including its steering mechanism, may be had by reference to my aforesaid copending application.

For summer use, the sled is equipped with rear wheels 14 and front wheels 15, suitably mounted on pivot centers for rotation thereabout, the fore wheels being steerable and the rear wheels being secured directly to the runners 2 and 3, while to the rear of the upright handle bars 13 the runners 2 and 3 are each equipped with a foot rest 16 so that a rider may stand upon them, and holding onto a transverse bar 17 connecting the upper ends of the upright handle bars 13, steer the sled, or wheeled vehicle, as the case may be. The combination brake mechanism which may be used to brake the speed of the vehicle, whether it be used as a wheeled vehicle or as a sled, is, of course, one of the primary features of my invention, and will now be described.

Preferably adjacent one of the handles 13 and rising substantially therealong is a flexible rod 18 having an end grip 19 adapted to be pulled upwardly by the hand of the rider standing on one of the foot-rests 16. This flexible rod is guided in its longitudinal movements by one or more (one shown) eye screws or the like 21 secured to one of the upright handle bars 13 and at its lower end this rod is pivotally connected to a yoke lever 22 extending transversely of the vehicle and pivoted as at 23 intermediate its ends to ferrules 24 secured to the runners 2 and 3 and adapted to receive and secure the upright handle bars 13. It will be noted that upon pulling upwardy on the flexible rod 18, the yoke bar 22 may be swung about its pivots to depress the lower ends thereof.

From each lower end of the yoke bar or yoke lever and pivotally connected thereto, a rod 25 extends to one end of a brake lever and brake shoe 26 to which it is pivotally connected, as at 27. The combined brake lever and shoe is in turn pivotally connected to the runner as shown at 28, so that when the operator or rider pulls upwardly on the rod 18, the combined brake levers and brake shoes are swung about their pivots 28 to engage the shoes with the peripheral surface of the wheels and thereby brake them. One or more springs 29 connected between suitable eye screws 31 and the lower ends of the yoke bar or yoke lever 22 serve to retract the brake shoes and rod 18 to their normal inoperative position, as will be apparent.

The rods 25 are preferably so connected to the lower ends of the yoke bar or yoke lever 22 that they may be readily disconnected therefrom and removed bodily with the combined brake shoes and lever 26 when the wheels are removed for use of the vehicle as a sled, and the lower corner 32 of the ends of the bars 22 is then adapted to serve as a brake when the vehicle is used as a sled on snow or ice by pulling up on the rod 18 to drive the corner into the snow or ice.

Since the vehicle may be easily and quickly transformed from a sled to a wheeled vehicle, or vice versa, the advantages of having a combined ice or snow and wheel brake from that standpoint as well as from the standpoint of simplicity of manufacture and use will be quickly appreciated, and although I have shown and described a preferred embodiment of my invention, it will be obvious that many details of construction may be widely modified and varied without departure from the essence of the invention and the scope of the appended claims.

I claim:

1. In a push sled of the character described having runners and a pair of sled steering handles rising from the runners, and means connecting said handles together, fore and aft wheels on said runners, a hand brake lever extending upwardly adjacent said handles, a detachable brake for use on one of said wheels, and means adapted to serve as a brake when the vehicle is used as a sled and affording connection between said lever and wheel brake.

2. In a push sled of the character described having runners and a pair of sled steering handles rising from the runners and means connecting said handles together, fore and aft wheels on said runners, a hand brake lever extending upwardly adjacent said handles, a detachable brake for use on one of said wheels, and means adapted to serve as a brake when the vehicle is used as a sled and affording connection between said lever and wheel brake.

3. In a push sled of the character described having runners and a handle bar rising from one of the runners, fore and aft wheels removably connected to said runners, a hand brake control rod extending upwardly adjacent said handle, a detachable brake for use on one of said wheels, and means adapted to serve as a brake when the vehicle is used as a sled affording connection between said rod and wheel brake.

In witness of the foregoing I affix my signature.

MARTIN O. CARLSON.